US012752268B2

(12) United States Patent
Cote

(10) Patent No.: US 12,752,268 B2
(45) Date of Patent: Oct. 6, 2026

(54) PIPETTE TIP ADAPTER

(71) Applicant: Mettler-Toledo Rainin, LLC, Oakland, CA (US)

(72) Inventor: Richard Cote, Hudson, MA (US)

(73) Assignee: Mettler-Toledo Rainin, LLC, Oakland, CA (US)

( * ) Notice: Subject to any disclaimer, the term of this patent is extended or adjusted under 35 U.S.C. 154(b) by 0 days.

(21) Appl. No.: 18/083,441

(22) Filed: Dec. 16, 2022

(65) Prior Publication Data

US 2023/0201822 A1 Jun. 29, 2023

Related U.S. Application Data

(63) Continuation of application No. 16/918,936, filed on Jul. 1, 2020, now Pat. No. 11,559,802, which is a (Continued)

(51) Int. Cl.
*B01L 3/00* (2006.01)
*B01L 3/02* (2006.01)

(52) U.S. Cl.
CPC ........... *B01L 3/5025* (2013.01); *B01L 3/0217* (2013.01); *B01L 3/0275* (2013.01); *B01L 3/5635* (2013.01);
(Continued)

(58) Field of Classification Search
None
See application file for complete search history.

(56) References Cited

U.S. PATENT DOCUMENTS 3,327,535 A 6/1967 Sequeira
3,683,977 A 8/1972 Crowe et al.
(Continued)

FOREIGN PATENT DOCUMENTS

WO 2011/007194 1/2011
WO 2013/012588 1/2013
(Continued)

OTHER PUBLICATIONS https://en.wikipedia.org/wiki/Polypropylene (Year: 2025).*
(Continued)

*Primary Examiner* — Brian R Gordon
(74) *Attorney, Agent, or Firm* — Standley Law Group LLP; Jeffrey S. Standley; Adam J. Smith

(57) ABSTRACT

An adapter for connecting an array of pipette tips having through bores with conical upper ends to a multichannel air displacement pipettor having a plurality of ports with compliant internal sealing surfaces. The adapter comprises a planar base with an array of openings extending between its top and bottom surfaces. Sealing tubes project upwardly from the top surface, and tip mounting tubes project downwardly from the bottom surface, with pairs of sealing tubes and tip mounting tubes being arranged coaxially and in communication with respective ones of the openings in the base. The tip mounting tubes are externally dimensioned and configured for insertion into the conical upper ends of the pipette tips, and the sealing tubes are externally configured and dimensioned for insertion into the ports of the pipettor and into sealing interengagement with their compliant internal sealing surfaces.

10 Claims, 10 Drawing Sheets

Related U.S. Application Data continuation of application No. 14/131,278, filed as application No. PCT/US2012/045925 on Jul. 9, 2012, now abandoned.

(60) Provisional application No. 61/509,577, filed on Jul. 20, 2011.

(52) U.S. Cl.
CPC ... *B01L 2200/021* (2013.01); *B01L 2200/023* (2013.01); *B01L 2200/025* (2013.01); *B01L 2200/026* (2013.01); *B01L 2300/0829* (2013.01)

(56) References Cited

U.S. PATENT DOCUMENTS

| | | | | |
|---|---|---|---|---|
| 3,778,351 | A | 12/1973 | Rosov | |
| 3,991,616 | A | 11/1976 | Stahli | |
| 4,215,092 | A | 7/1980 | Suovaniemi et al. | |
| 4,237,095 | A | 12/1980 | Suovaniemi et al. | |
| 4,444,062 | A * | 4/1984 | Bennett | B01L 3/0217 422/923 |
| 4,734,261 | A | 3/1988 | Koizumi et al. | |
| 4,863,695 | A * | 9/1989 | Fullemann | B01L 3/0275 422/922 |
| 4,961,350 | A * | 10/1990 | Tennstedt | B01L 3/0275 422/922 |
| 6,116,099 | A * | 9/2000 | Carl | B01L 9/543 73/863.32 |
| 6,143,252 | A | 11/2000 | Haxo, Jr. et al. | |
| 6,159,368 | A | 12/2000 | Moring et al. | |
| 6,419,086 | B1 * | 7/2002 | Vecchio | B01L 9/543 206/366 |
| 6,451,263 | B1 * | 9/2002 | Sarrine | B01L 3/0217 73/864.12 |
| 6,923,938 | B2 | 8/2005 | Cote et al. | |
| 6,982,063 | B2 | 1/2006 | Hamel et al. | |
| 7,060,226 | B1 * | 6/2006 | Jessop | B01L 9/543 422/526 |
| 7,335,337 | B1 | 2/2008 | Smith et al. | |
| 7,968,056 | B2 | 6/2011 | Stockwell | |
| 8,118,167 | B2 | 2/2012 | Togashi et al. | |
| D675,748 | S | 2/2013 | Hilligoss et al. | |
| D677,400 | S | 3/2013 | Blaettler et al. | |
| D680,226 | S | 4/2013 | Motadel et al. | |
| 8,485,357 | B2 | 7/2013 | Song et al. | |
| 8,591,832 | B2 | 11/2013 | Nelson | |
| D694,907 | S | 12/2013 | Okihara | |
| D694,908 | S | 12/2013 | Okihara | |
| 8,899,118 | B1 * | 12/2014 | Seguin | G01N 35/1074 73/863.32 |
| 9,084,993 | B2 | 7/2015 | Naumann et al. | |
| D804,050 | S | 11/2017 | Coulling et al. | |
| D804,052 | S | 11/2017 | Dadachanji et al. | |
| D815,753 | S | 4/2018 | Curry et al. | |
| D824,535 | S | 7/2018 | Curry et al. | |
| D848,638 | S | 5/2019 | Sims et al. | |
| D861,190 | S | 9/2019 | Potdar et al. | |
| D867,614 | S | 11/2019 | Jones et al. | |
| 10,821,434 | B2 | 11/2020 | Cote | |
| D905,267 | S | 12/2020 | Cote | |
| 2002/0074342 | A1 * | 6/2002 | Shafer | B01L 3/0262 435/6.12 |
| 2002/0086440 | A1 | 7/2002 | Lehtinen et al. | |
| 2002/0125197 | A1 | 9/2002 | Hager et al. | |
| 2002/0146353 | A1 | 10/2002 | Bevirt et al. | |
| 2004/0071602 | A1 | 4/2004 | Yiu | |
| 2004/0166587 | A1 * | 8/2004 | Farquharson | G01N 1/40 422/400 |
| 2004/0231438 | A1 | 11/2004 | Schwartz | |
| 2005/0006417 | A1 * | 1/2005 | Nicol | B01L 3/0241 222/420 |
| 2006/0048367 | A1 * | 3/2006 | Ishihama | B01L 3/0275 29/34 R |
| 2007/0048188 | A1 | 3/2007 | Bigus | |
| 2007/0221684 | A1 | 9/2007 | Steinbrenner et al. | |
| 2008/0095671 | A1 * | 4/2008 | Mathus | B01L 3/0279 422/561 |
| 2008/0101996 | A1 * | 5/2008 | Daf | G01N 35/1065 422/400 |
| 2009/0007702 | A1 * | 1/2009 | Yiu | B01L 9/543 422/400 |
| 2009/0129985 | A1 | 5/2009 | Ikushima | |
| 2010/0111769 | A1 * | 5/2010 | Ding | B01L 3/0217 422/400 |
| 2010/0196210 | A1 * | 8/2010 | Jungheim | B01L 3/0275 422/526 |
| 2010/0252579 | A1 | 10/2010 | Steinbrenner et al. | |
| 2011/0268628 | A1 | 11/2011 | Warhurst et al. | |
| 2011/0286897 | A1 | 11/2011 | Uschkureit et al. | |
| 2012/0103861 | A1 | 5/2012 | Song et al. | |
| 2012/0213677 | A1 * | 8/2012 | Petrek | B01L 3/021 422/524 |
| 2012/0258026 | A1 | 10/2012 | Naumann | |
| 2013/0047751 | A1 | 2/2013 | Voss et al. | |
| 2013/0078624 | A1 | 3/2013 | Holmes et al. | |
| 2013/0323829 | A1 * | 12/2013 | Torterella | B01L 3/508 29/428 |
| 2015/0273463 | A1 * | 10/2015 | Motadel | B01L 3/0279 422/500 |
| 2016/0033543 | A1 * | 2/2016 | Stankus | B01L 3/502 435/6.12 |
| 2016/0167041 | A1 | 6/2016 | Curry et al. | |
| 2017/0282187 | A1 * | 10/2017 | Yiu | B01L 3/0275 |
| 2017/0282188 | A1 * | 10/2017 | Yiu | B01L 9/543 |
| 2017/0354965 | A1 | 12/2017 | Cote | |
| 2017/0361323 | A1 * | 12/2017 | Guzman | B01L 3/0275 |
| 2018/0117584 | A1 | 5/2018 | Cote | |
| 2021/0008542 | A1 | 1/2021 | Cote | |
| 2021/0178400 | A1 * | 6/2021 | Sager | B01L 3/5085 |

FOREIGN PATENT DOCUMENTS

| | | |
|---|---|---|
| WO | 2013/181163 | 12/2013 |
| WO | 2016/081595 | 5/2016 |
| WO | 2016/094553 | 6/2016 |
| WO | 2020/198347 | 10/2020 |

OTHER PUBLICATIONS https://www.xometry.com/resources/materials/polypropylene/ (Year: 2022).*

Ex Parte Quayle Action Received dated Jul. 6, 2020 in U.S. Appl. No. 29/685,275, filed Mar. 27, 2019, 10 pages.

International Preliminary Report on Patentability mailed on Jan. 30, 2014 in International Patent Application No. PCT/US2012/045925, filed on Jul. 9, 2012, 8 pages.

International Preliminary Report on Patentability mailed on Jun. 1, 2017 in International Patent Application No. PCT/US2015/061329, filed on Nov. 18, 2015, 9 pages.

International Search Report and Written Opinion mailed on Dec. 7, 2012 in International Patent Application No. PCT/US2012/045925, filed on Jul. 9, 2012, 9 pages.

International Search Report and Written Opinion mailed on Jan. 29, 2016 in International Patent Application No. PCT/US2015/061329, filed on Nov. 18, 2015.

Office Action dated Apr. 6, 2018 in U.S. Appl. No. 14/131,278, filed Apr. 29, 2014 and published as US 2018-0117584 on May 3, 2018, 6 pages.

Office Action dated Aug. 27, 2018 in U.S. Appl. No. 14/131,278, filed Apr. 29, 2014 and published as US 2018-0117584 on May 3, 2018, 10 pages.

Office Action dated Feb. 4, 2019 in U.S. Appl. No. 14/131,278, filed Apr. 29, 2014 and published as US 2018-0117584 on May 3, 2018, 11 pages.

Office Action dated Jan. 7, 2020 in U.S. Appl. No. 14/131,278, filed Apr. 29, 2014 and published as US 2018-0117584 on May 3, 2018, 11 paqes.

(56) References Cited

OTHER PUBLICATIONS

Office Action dated Jul. 15, 2019 in U.S. Appl. No. 14/131,278, filed Apr. 29, 2014 and published as US 2018-0117584 on May 3, 2018, 8 pages.
Office Action dated Jun. 23, 2020 in U.S. Appl. No. 15/527,419, filed May 17, 2017 and published as US 2017-0354965 on Dec. 14, 2017, 10 pages.
Office Action dated Sep. 9, 2019 in U.S. Appl. No. 15/527,419, filed May 17, 2017 and published as US 2017-0354965 on Dec. 14, 2017, 19 pages.
Office Action in U.S. Appl. No. 29/685,275, filed Mar. 27, 2019, 7 pages.
International Search Report and Written Opinion mailed on Nov. 26, 2020 in International Patent Application No. PCT/US2020/024696, filed on Mar. 25, 2020, 38 pages.

* cited by examiner

PIPETTE TIP ADAPTER

CROSS REFERENCE TO RELATED APPLICATIONS

This patent application is a continuation of U.S. Pat. application Ser. No. 16/918,936, filed Jul. 1, 2020, now U.S. Pat. No. 11,559,802, issue date Jan. 24, 2023, which is a continuation of U.S. Ser. No. 14/131,278 filed on Apr. 29, 2014, now abandoned, which is a U.S. National Stage filing under 35 U.S.C. 371 of International Application No. PCT/US2012/045925 filed Jul. 9, 2012, which claims priority to U.S. Provisional Appln. No. 61/509,577 filed on Jul. 20, 2011, all of the above-referenced applications are incorporated herein by reference in their entireties.

BACKGROUND

1. Field on the Invention

This invention relates generally to multichannel air displacement pipettors employing disposable pipette tips, and is concerned in the particular with the provision of an adapter for providing an interface between the pipette tips and the pipettor.

2. DESCRIPTION OF THE RELATED ART

Air displacement pipettors are typically used to transfer liquids between vessels as part of an assay. Common vessels are microtiter plates, test tubes and reservoirs.

Air displacement pipettors frequently make use of a piston and cylinder arrangement, which is used to create positive and negative pressure in an attached pipette tip. When the open end of the tip is placed into a liquid, the change in pressure causes the liquid to be aspirated into, or dispensed from, the interior of the pipette tip, Cross contamination can occur when a first liquid sample aspirated into and then dispensed from a pipette tip leaves a residual amount of sample in the tip. A subsequently aspirated sample mixes with the residual first sample and is thus contaminated. This type of cross contamination can also occur through residual sample on the exterior of the pipette tip.

In order to avoid cross contamination errors, most air displacement pipettors are designed to make use of pipette tips that are relatively low cost and therefore, in critical applications, disposable after each aspirate-dispense cycle. The design of the pipette tip and its associated mounting shaft is well established. The pipette tips are commonly injection molded in a chemically resistant material such as polypropylene. They are conical in shape. The pipettor's mounting shaft is typically cylindrical with a slight taper that closely matches the conical angle and diameter of the tip. The tip is installed by applying an axial force to the mounting shaft that forces the tapered portion of the shaft into the tip. Flexibility of the tip material allows it to stretch radially and provide both an air-tight seal and mechanical stability of the tip to the pipetting device. The typical axial force required to securely mount a single tip onto a tip mounting shaft is between 1.5 and 4 lbs. To remove the pipette tip from the pipettor, a stripper mechanism is typically used to push the tip from the mounting shaft. Tip ejection forces are in the same range as the mounting forces.

In order to increase productivity, air displacement pipettors with 96, 384 and higher numbers of channels have been developed. These multichannel pipettors must generate relatively high force in the direction of the axis of the tips in order to simultaneously install the array of tips. For example, a 96 channel pipettor using tips with average insertion forces will require over 200 lbs of axial force to successfully install all of the tips. These forces are typically generated through the use of mechanical force multipliers (levers) or powered electromechanical systems. The structure of the pipettor has to be robust in order to support the high tip loading force without distortion. This leads to heavier designs that require more power to operate effectively. In addition to these design issues, the safety of the user is also a significant concern when such high forces are present.

Pipette tips are frequently packaged in a rack that positions them with their top surfaces in a common plane with centerline spacing that matches that of the instrument. For example, a 96 channel pipette tip rack holds an 8×12 array of tips with 9 mm between centers. The high forces required to attach all of the tips in the rack often causes the tip rack to bow in the center of the array, resulting in poor sealing and attachment of centrally located tips. To counter this, tip manufacturers reinforce the tip racks intended for use with multichannel pipettors. This, in turn, increases the cost of the racks and therefore the cost to operate the instrument.

Other multichannel pipettor manufacturers have developed proprietary pipette tips that are designed to lower the insertion and ejection forces. These tips are often more complex and expensive to produce and usually lock the customer into purchasing the manufacturer's specially designed tip for the life of the instrument.

SUMMARY

Broadly stated, embodiments of the present invention address the drawbacks of the prior art by providing a pipette tip adapter whose purpose is to adapt commonly available low cost pipette tips to a multichannel air displacement pipettor in a way that reduces the mounting and ejection forces described above. Any universal pipette tip available in the marketplace can be assembled to the pipette tip adapter. End users of the related multichannel air displacement pipettor designed to accept the pipette tip adapter would install the assembly onto the pipettor. The pipette tip adapter reduces the forces required to mount and seal the tips to less than 10 lbs. Ejection forces are equally reduced.

In exemplary embodiments, the pipette tip adapter of the present invention comprises a planar base with an array of openings extending between its top and bottom surfaces. Sealing tubes project upwardly from top surface of the base, and tip mounting tubes project downwardly from the bottom surface of the base. Pairs of sealing tubes and tip mounting tubes re arranged coaxially and in communication with respective ones of the openings in the base. The tip mounting tubes are externally dimensioned and configured for insertion into the conical upper ends of pipette tips, and the scaling tubes are externally configured and dimensioned for insertion into ports of a multichannel air displacement pipettor.

The base may preferably be strengthened by networks of reinforcing ribs on its top and/or bottom surfaces.

These and other objects, features and advantages of the present invention will become more apparent from a reading of the following detailed description in conjunction with the accompanying drawings.

DETAILED DESCRIPTION

Figure 1:
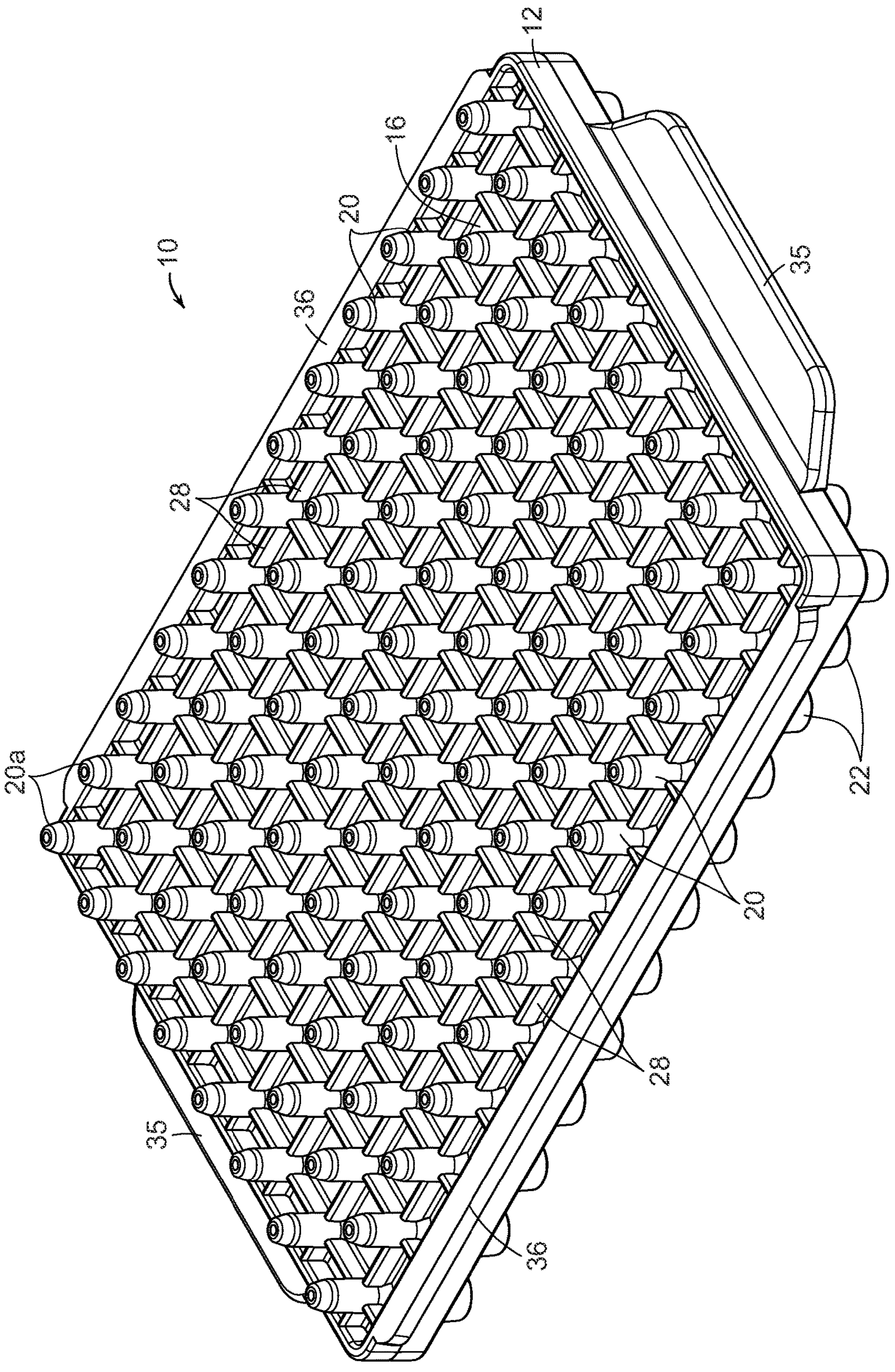
FIG. 1 is a top perspective view of a pipette tip adapter in accordance with an exemplary embodiment of the present invention.
Figure 2:
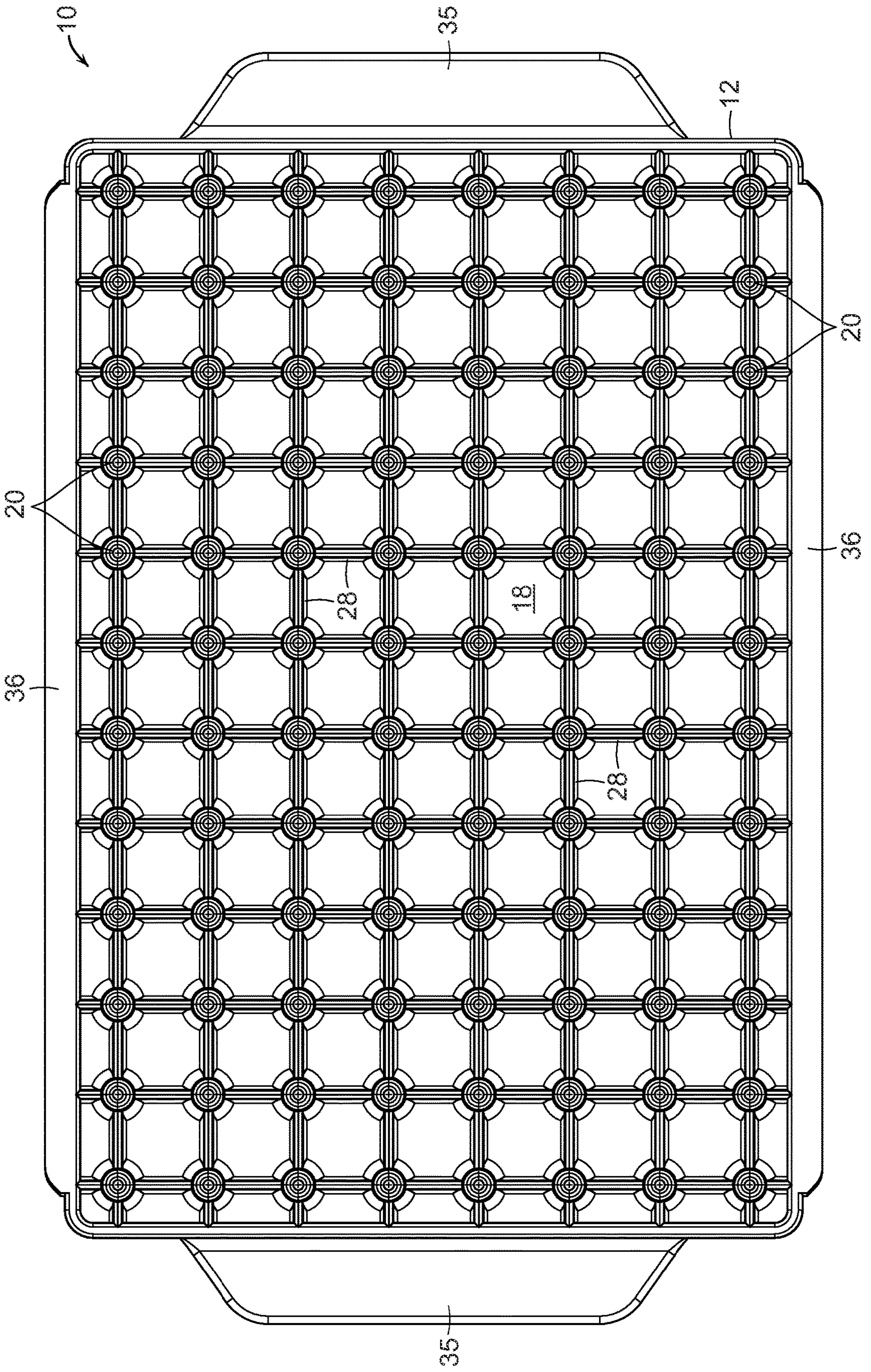
FIG. 2 is a top view of the pipette tip adapter.
Figure 3:
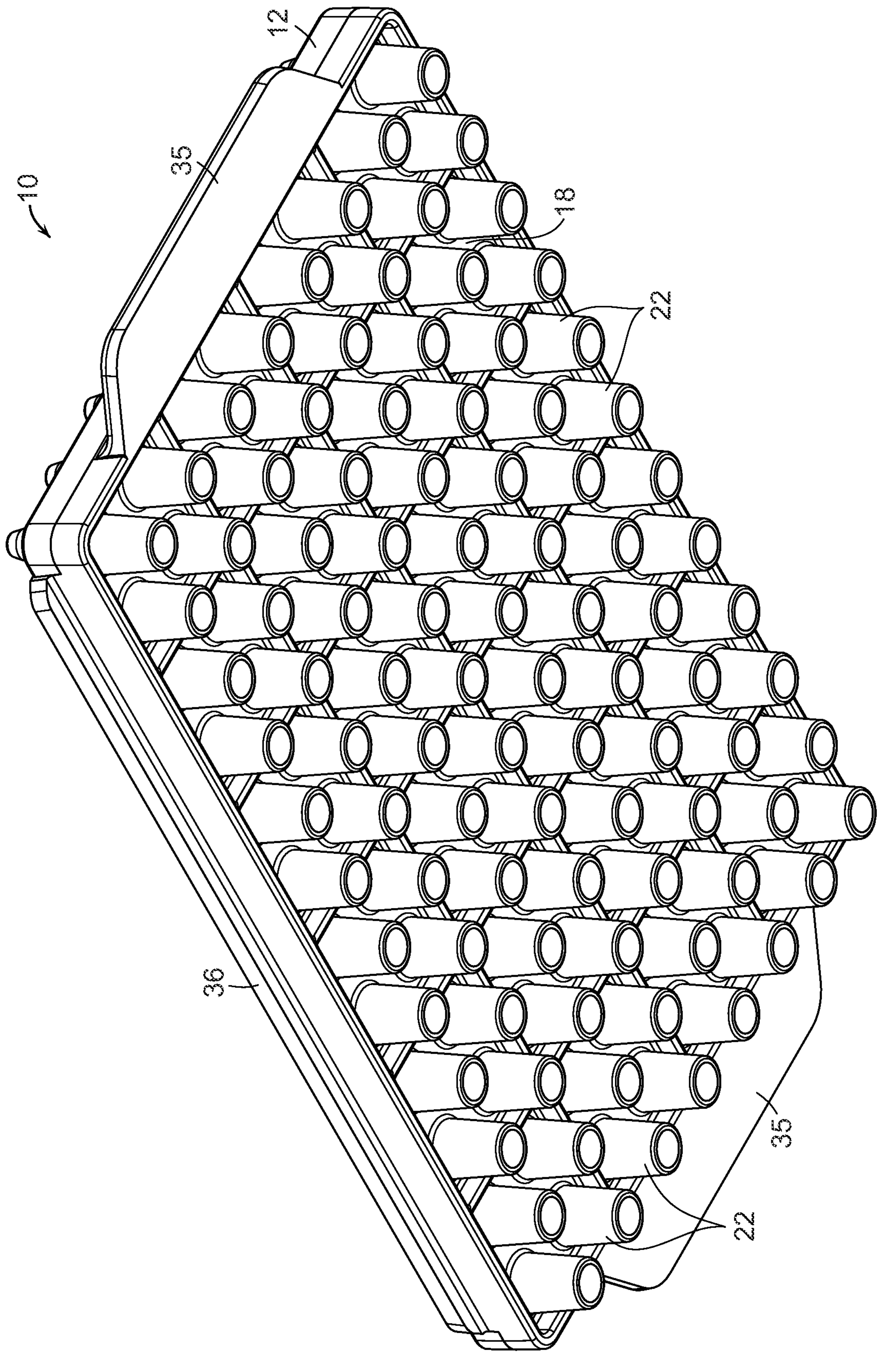
FIG. 3 is a bottom perspective view of the pipette tip adapter.
Figure 4:
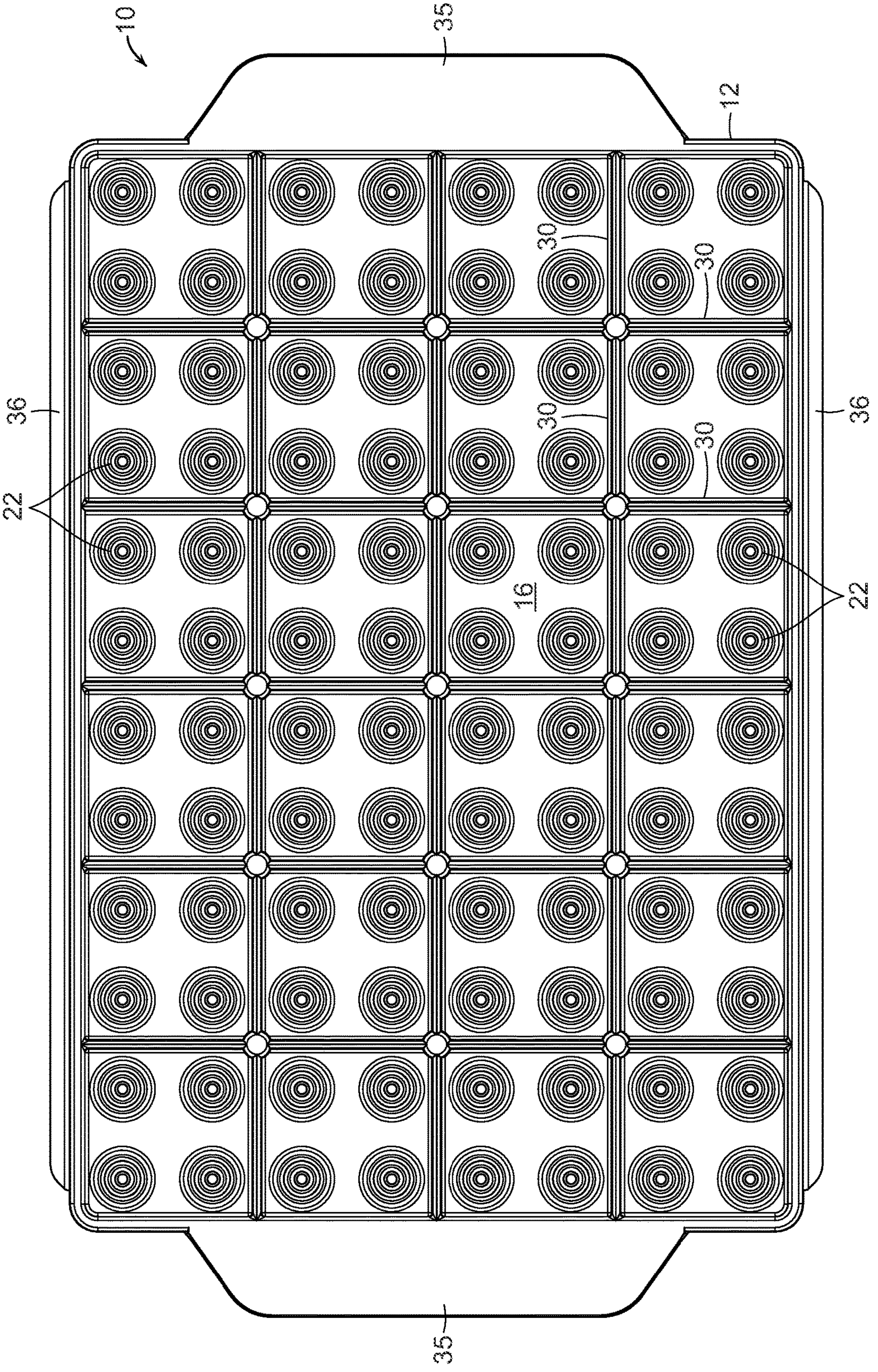
FIG. 4 is a bottom view of the pipette tip adapter.

With reference initially to FIGS. 1-6, a pipettor tip adapter in accordance with an exemplary embodiment of the present invention is generally indicated at 10. The pipette tip adapter comprises a planar base 12 with an array of openings 14 extending between bottom and top surface 16, 18 of the base.

Sealing tubes indicated typically at 20 project upwardly from the top surface 16, and tip mounting tubes indicated typically at 22 project downwardly from the bottom surface 18. Pairs of sealing tubes 20 and mounting tubes 22 are arranges coaxially and in communication with respective ones of the openings 14 in the base 12.

The sealing tubes 20 and tip mounting tubes 22 may be arranged in an array of rows and columns. The spacing of the rows and columns matches the commonly available tip spacing of both multichannel pipettors and associated racks found in the marketplace. These in turn match the well positions of commonly available microtiter plates. Nine and four and a half millimeters are two common spacing distances. By way of example, a 96 channel pipettor has twelve rows and eight columns of tips on nine millimeter spacing, while a 384 channel pipettor has a twenty four by sixteen matrix on a four and a half millimeter spacing. This invention can also be used in a one-dimensional array format. For example, a single row of twelve on a nine mm spacing.

Figure 5:
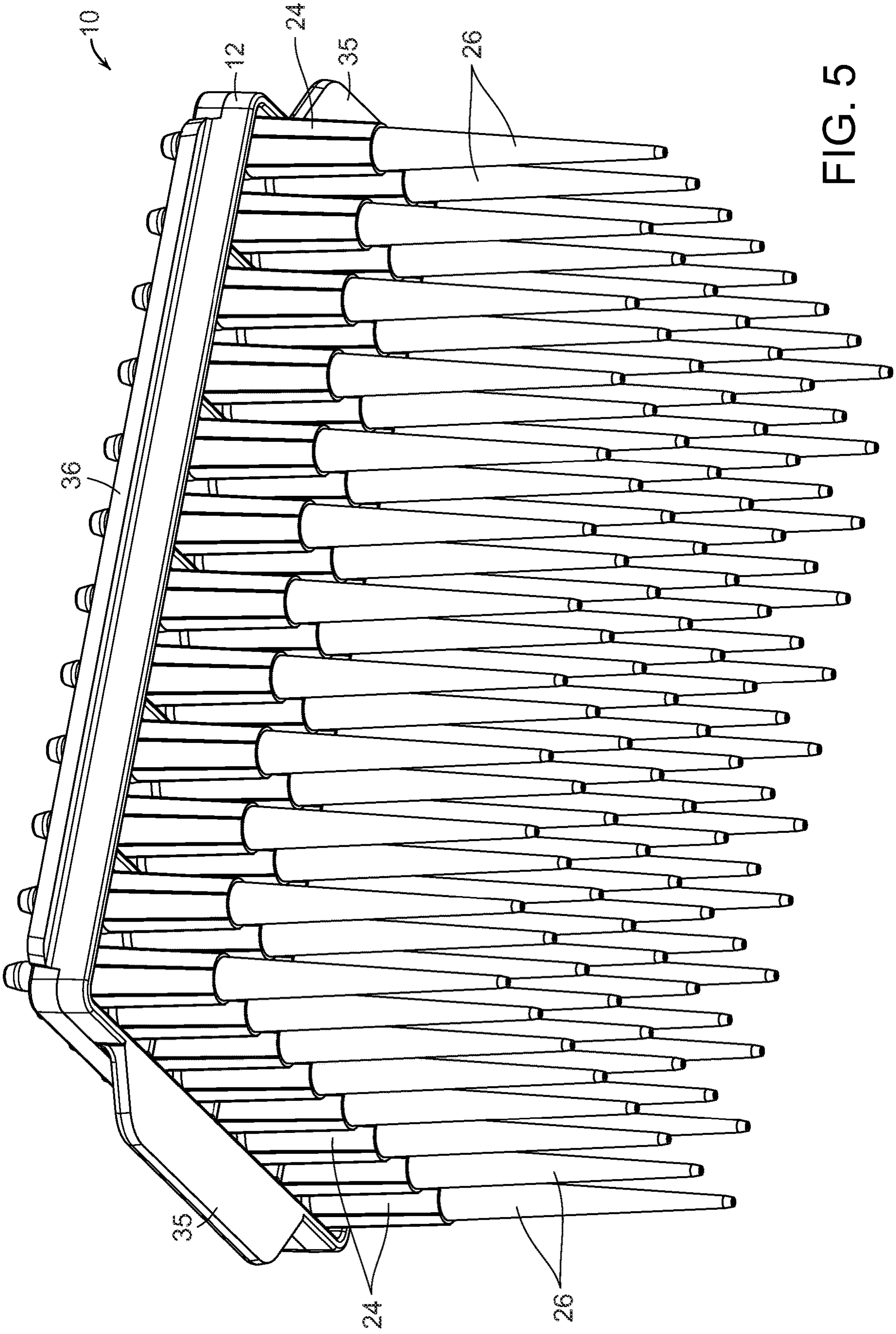
FIG. 5 is a bottom perspective view showing the pipette tip adapter attached to an array of pipette tips.
Figure 6:
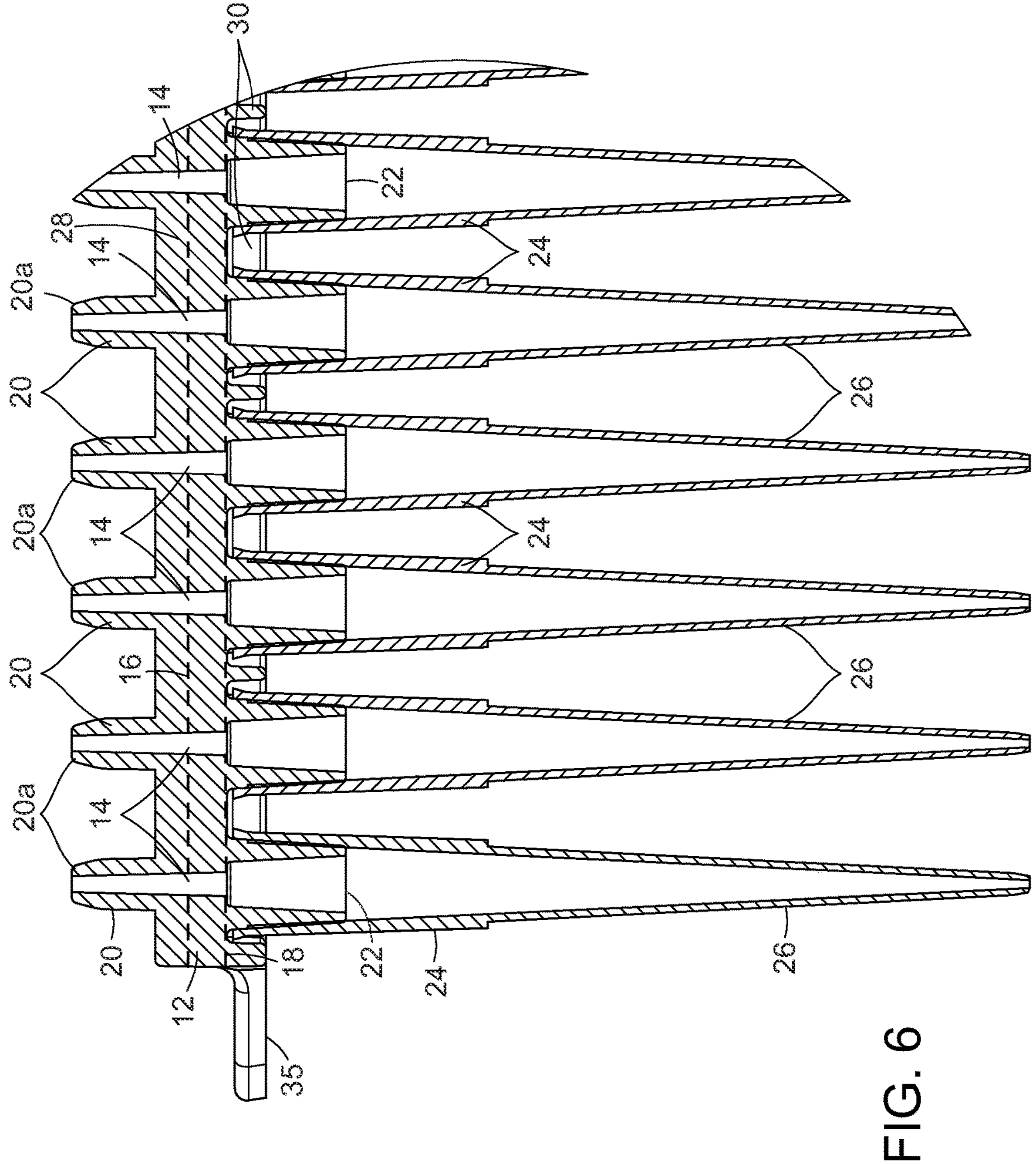
FIG. 6 is a partial sectional view through the pipette tip adapter and attached pipette tips.

As can be best seen in FIG. 6, the tip mounting tubes 22 comprise truncated conical cones configured and dimensioned for insertion and sealing interengagement with the conical upper ends 24 of pipette tips 26. FIG. 5 shows an array of pipette tips 26 secured to the tip mounting tubes of the adapter.

Base 12 may be advantageously strengthened by a network of upper reinforcing ribs 28 on its top surface 16, and/or a similar network of lower reinforcing ribs 30 on its bottom surface 18. The sealing tubes 20 may be located where the upper reinforcing ribs 28 converge, whereas the tip mounting tubes 22 may be located in areas of the bottom surface bracketed by the lower reinforcing ribs 30.

The sealing tubes 20 have cylindrical walls with chamfered upper ends 20*a*. The tip mounting tubes 22 project downwardly below the lower reinforcing ribs 30, and the sealing tubes 20 project upwardly above the upper reinforcing ribs 28.

Figure 7:
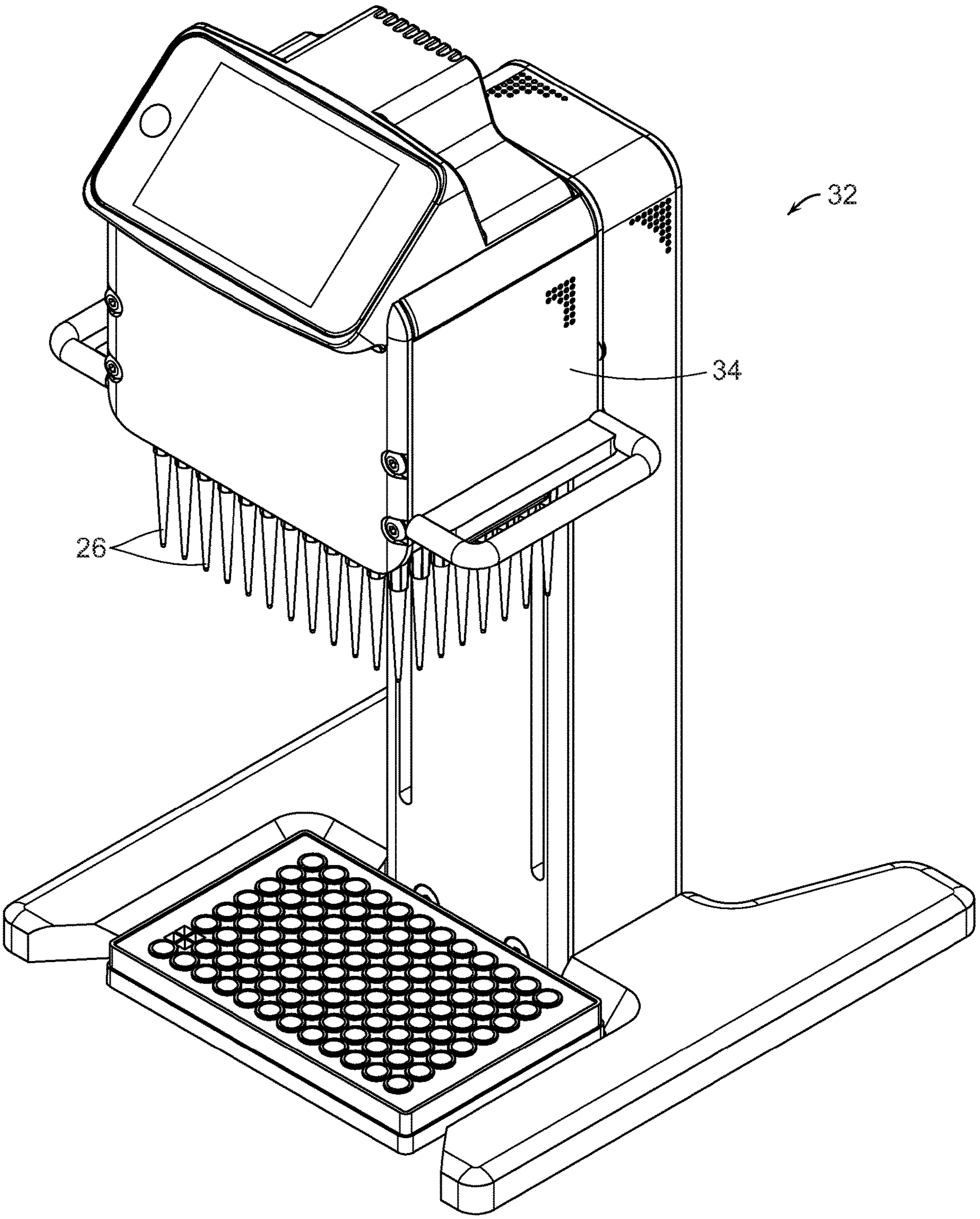
FIG. 7 is a perspective view of a multichannel air displacement pipettor designed to employ the pipette tip adapter of the present invention.

With reference to FIG. 7, a multichannel air displacement pipettor is generally indicated at 32. The head 34 of the pipettor is designed to accept the pipette adapter 10 of the present invention. To this end, the pipette adapter may be provided with laterally extending rails 36 which are designed to slide into receiving slots in the pipettor head. Tabs 35 also may be provided to facilitate handling the adapter.

Figure 8:
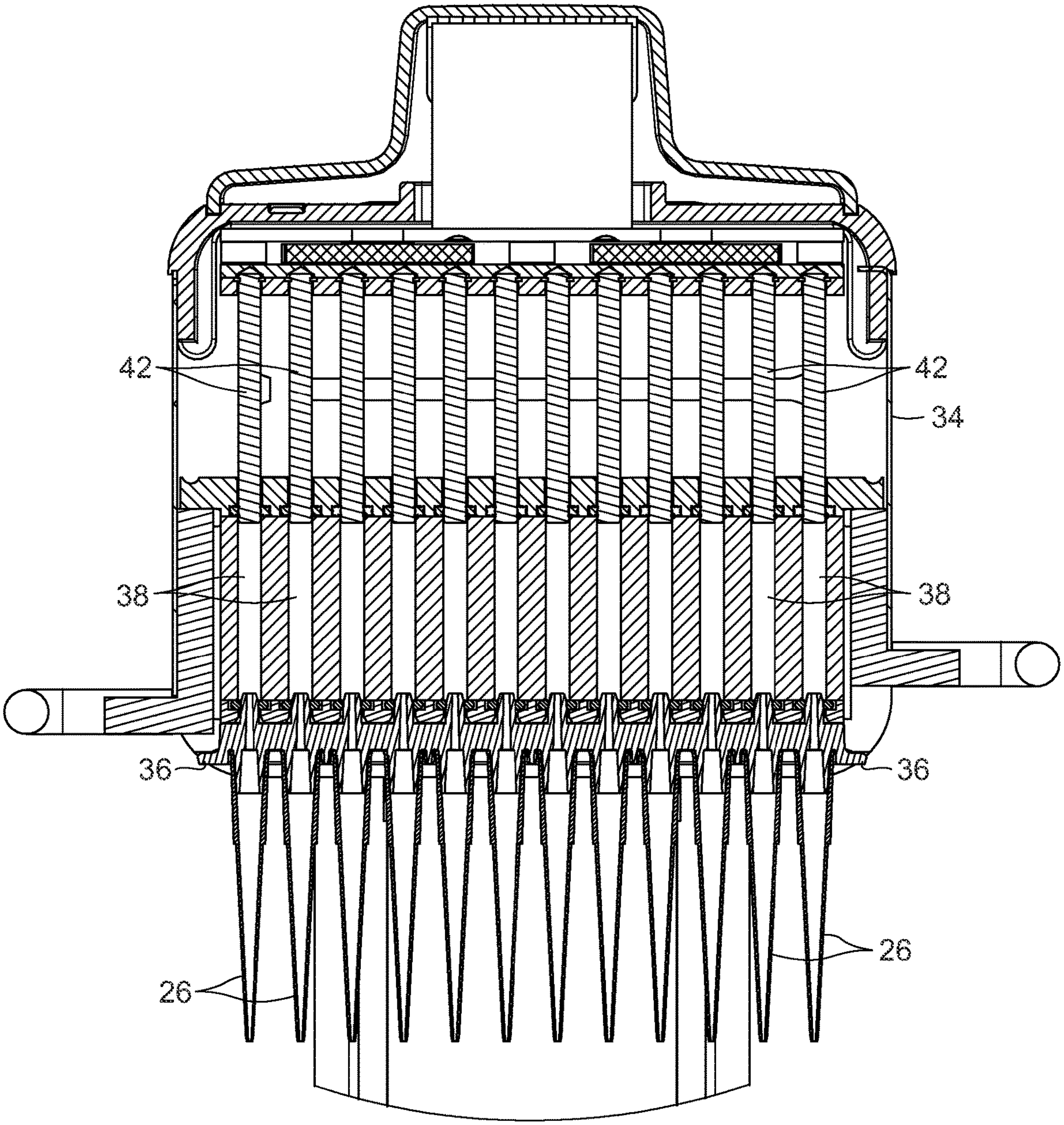
FIG. 8 is a sectional view on an enlarged scale taken through the operating head of the pipettor shown in FIG. 7, and showing the pistons fully withdrawn.
Figure 9:
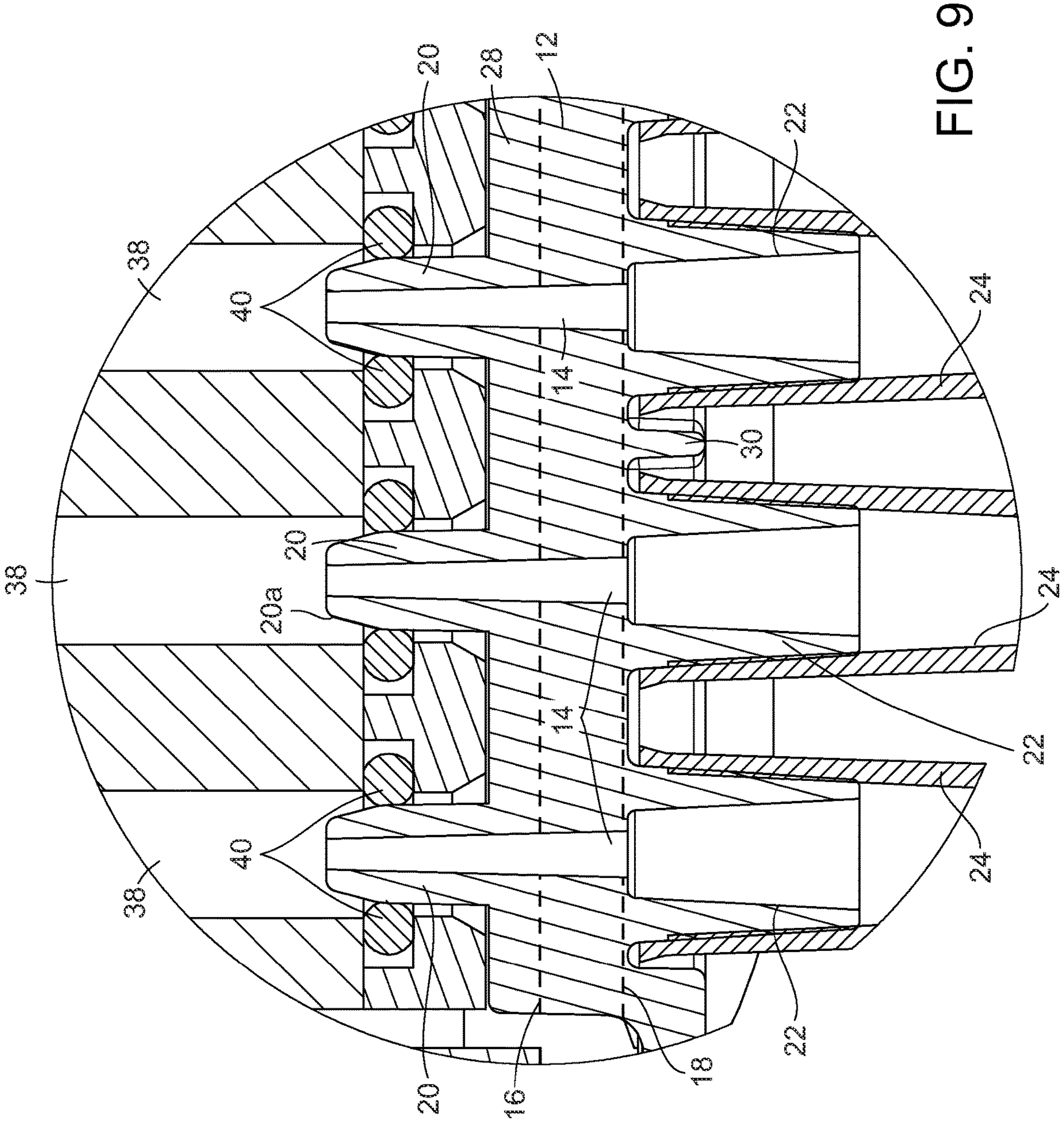
FIG. 9 is an enlarged view of a portion of the illustration in FIG. 8.
Figure 10:
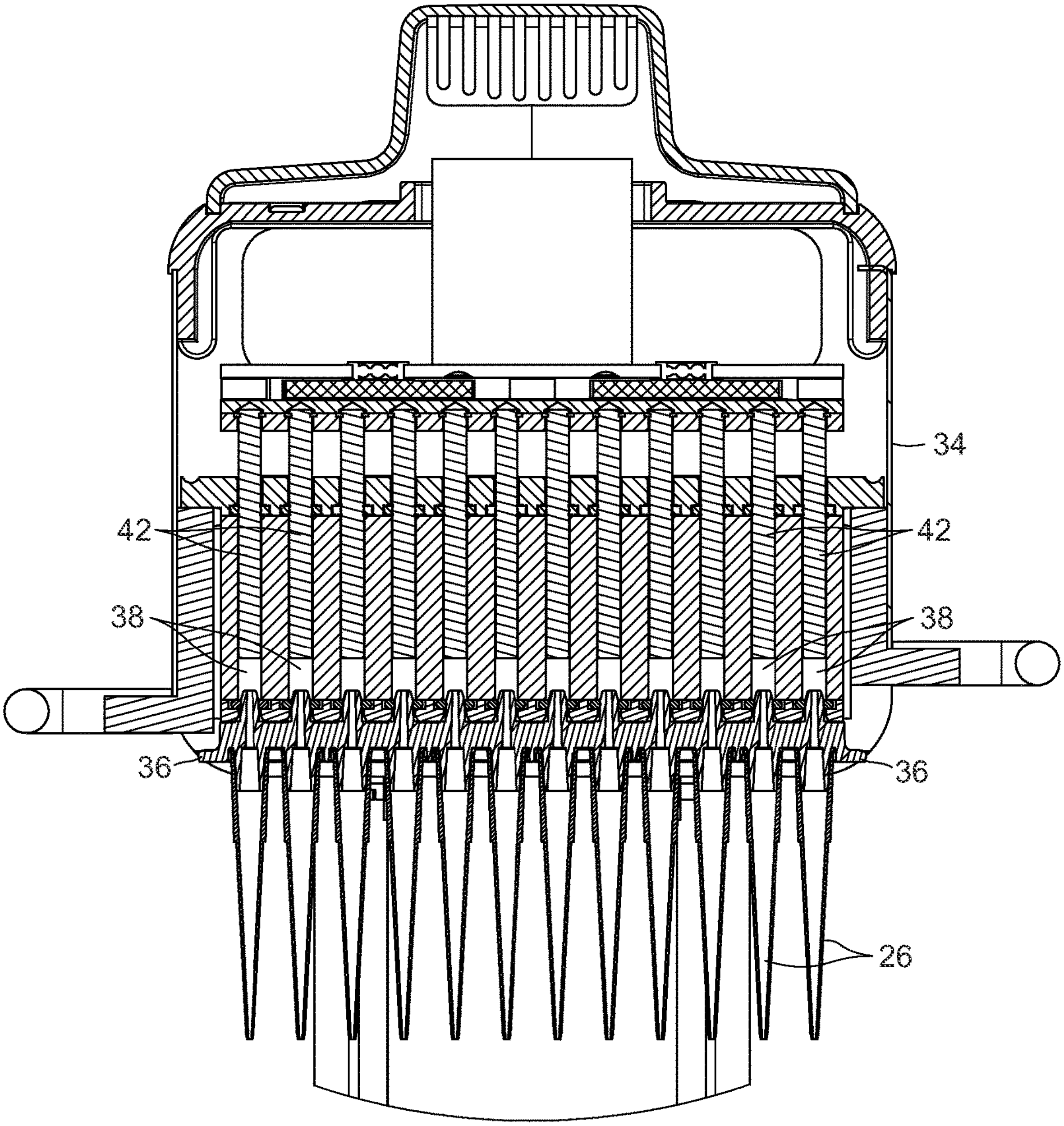
FIG. 10 is a view similar to FIG. 8, showing the pistons of the pipettor partially advanced.

As shown in FIGS. 8 and 10, the pipettor head has an array of cylinders indicated typically at 38 matching the array of sealing tubes 20 of the tip adapter 10. The cylinders 38 lead to ports lined with O-rings providing compliant internal sealing surfaces. Although O-rings 40 are shown, any equivalent compliant seal material and appropriate geometry could be employed. For example, a sheet of elastomeric material with a matrix of aligned bore holes could be employed.

The chamfered upper ends 20*a* of the sealing tubes serve to lower the insertion forces of the sealing tubes into the ports of the pipettor cylinders 38 while also reducing wear and tear of the O-rings 40 or other like compliant sealing surfaces.

Pistons indicated typically at 42 are arranged for reciprocal movement in the cylinders 38. In FIG. 8, the pistons 42 are withdrawn in the cylinders 38 away from the adapter 10, and in FIG. 10, the pistons are shown advanced in the cylinders.

The tip adapter 10 is preferably injection molded using standard tooling methods and common processing techniques. Materials can include any rigid injection moldable polymer, with polypropylene being preferred. Additionally, a polymer with an internal lubricant that blooms to the surface of the part is preferable because the presence of the lubricant on the surface will reduce insertion forces and wear and tear on the seals.

The exemplary embodiment herein described is preferably disposable. A non-disposable version is also possible, its design being essentially identical but produced from a material that is more robust and autoclavable. In such a design, the tips are installed to the adapter by the user with a dedicated fixture.

To reduce the capital cost required to build injection molds, multiple tip size geometries can be accommodated in a single adapter by arranging the tip mounting tubes in a tiered geometry, where the larger tips fit on one tier and the smaller tips on a second tier.

Often, disposable pipette tips incorporate filters. The purpose of the filter is to avoid aerosol contamination of the pipette mechanism by the liquid being pipetted. The pipette tip adapter of the present invention may be configured to accept such filters, thereby eliminating the need to use expensive tips with filters pre-installed in them.

In light of the above, it will now be appreciated by those skilled in the art that the adapter of the present invention offers significant and heretofore unavailable advantages. The chamfered upper ends 20*a* of the sealing tubes 20 interact with the O-rings or equivalent compliant sealing materials to beneficially reduce the forces required to connect the pipette tips to the pipettor. For example, in the case of a 96 channel pipettor, the adapter's sealing tubes 20 can be successfully inserted into the cylinder ports of the pipettor with a minimal coupling force on the order of 10 lbs. This can be accomplished safely without exposing an operator to potential injury.

The adapter base 12, preferably when strengthened by the upper and/or lower reinforcing ribs 28, 30, provides a rigid platform supporting the tip mounting tubes 22 and sealing tubes 20. Thus, the adapter can be pressed onto an array of pipette tubes without undergoing deflection that might otherwise compromise uniform and reliable sealed insertion of the tip mounting tubes 22. This same rigidity, when coupled with the minimal coupling forces referenced above, results in a more uniform and reliable insertion of the sealing tubes into the pipettor cylinder ports.

Higher forces may be required to install the pipette tips on the adapter, but this can be accomplished in a factory setting prior to supplying the loaded adapter to a user, or by the user with a specially designed press incorporating appropriate safety features.

While exemplary embodiments of the invention have been disclosed, modification, additions and deletions can be made without departing from the spirit and scope of the inventions as set forth in the following claims.

What is claimed is:

1. An adapter assembly for use with a multichannel air displacement pipettor having a plurality of ports each having internal sealing surfaces, the adapter assembly comprising:

an adapter comprising:

a planar base comprising a top surface, a bottom surface and a plurality of openings extending between the top surface and the bottom surface;

hollow sealing tubes projecting from the top surface of the planar base; and hollow tip mounting tubes projecting from the bottom surface of the planar base;

wherein:

each of the hollow sealing tubes is arranged coaxially with one of the hollow tip mounting tubes in a pair at one corresponding opening of the plurality of openings in the planar base;

each of the hollow sealing tubes is externally dimensioned for insertion into each one of the plurality of ports of the multichannel air displacement pipettor and for sealing inter-engagement with the internal sealing surface of each port of the plurality of ports of the multichannel air displacement pipettor;

an outer diameter of each of the hollow sealing tubes is less than an outer diameter of each of the corresponding hollow tip mounting tubes;

the plurality of openings in the planar base, the corresponding hollow sealing tubes and the corresponding hollow tip mounting tubes are disposed in an array comprising rows and columns;

each of the hollow sealing tubes consists of a continuous exterior surface, a continuous interior surface, a chamfered end and a polypropylene polymer;

each of the hollow tip mounting tubes is a hollow truncated cone consisting of a continuous exterior surface, a continuous interior surface and the polypropylene polymer; and the planar base is comprised of the polypropylene polymer; and an array of pipette tips connected to the adapter, wherein:

each of the pipette tips in the array of pipette tips comprises a through bore; and each of the pipette tips in the array of pipette tips is in sealing inter-engagement with the continuous exterior surface of each one of the corresponding hollow tip mounting tubes of the adapter.

2. The adapter assembly of claim 1, wherein the planar base comprises a network of upper reinforcing ribs disposed on the top surface of the planar base.

3. The adapter assembly of claim 2, wherein the hollow sealing tubes project further from the top surface of the planar base than the network of upper reinforcing ribs.

4. The adapter assembly of claim 1, wherein the planar base comprises a network of lower reinforcing ribs disposed on the bottom surface of the planar base.

5. The adapter assembly of claim 4, wherein the hollow tip mounting tubes project further from the bottom surface of the plannar base than the network of lower reinforcing ribs.

6. The adapter assembly of claim 1, wherein the planar base comprises a first side, an opposing second side, a tab laterally extending from the first side and a tab laterally extending from the second side.

7. The adapter assembly of claim 1, wherein the hollow sealing tubes project a distance from the top surface of the planar base, and the distance is the same for all of the hollow sealing tubes.

8. The adapter assembly of claim 2, wherein the upper reinforcing ribs consist of the polypropylene polymer.

9. The adapter assembly of claim 4, wherein the lower reinforcing ribs consist of the polypropylene polymer.

10. The adapter assembly of claim 6, wherein each tab consists of the polypropylene polymer.

* * * * *